UNITED STATES PATENT OFFICE.

JOSEPH ALBERT BRADBURN AND JOHN DOWNER PENNOCK, OF SYRACUSE, NEW YORK.

PROCESS OF OBTAINING ALUMINA FROM BAUXITE.

SPECIFICATION forming part of Letters Patent No. 461,416, dated October 20, 1891.

Application filed April 24, 1891. Serial No. 390,294. (No specimens.)

*To all whom it may concern:*

Be it known that we, JOSEPH ALBERT BRADBURN and JOHN DOWNER PENNOCK, of Syracuse, in the county of Onondaga, in the State of New York, have invented new and useful Improvements in Processes for the Extraction of Alumina from Mineral Earths, of which the following, is a full, clear, and exact description.

Our invention relates to the extraction of alumina from the mineral earths in which, in nature, it is associated with various other oxides.

Our object is to produce a commercially-pure alumina ($Al_2O_3$) from minerals or that class of minerals which allow part or all of their hydrated alumina to be dissolved out by the use of a caustic soda solution as the disintegrating agent and separating the alumina from the caustic liquor by precipitation, gathering it, and rendering it anhydrous by calcining.

Our invention consists in the process hereinafter described, and which is specifically set forth in the claims hereunto annexed.

We take mineral bauxite in its hydrated condition, in which the iron present is in its highest state of oxidation—viz., $Fe_2O_3$—and which accordingly is wholly or nearly free from organic matters. In case the bauxite does not contain organic matters or its iron in the ferrous condition, we oxidize these substances by mixing the ground mineral with a solution of a hypochlorite, such as bleaching-powder, and then pass in carbonic-acid gas, and the liberated chlorine oxidizes the iron and organic matter.

We will first describe the process as applied to red bauxite, in which the iron is already fully oxidized. We first grind it hydrated as it comes from the earth, then treat it with a solution of caustic soda containing about one hundred and fifty grams $Na_2O$ per liter in a digester for about five hours, with agitation to prevent the mineral from packing together and to better expose the mineral to the action of the solution during the heating therein. We can dispense with the grinding in case the mineral is not too hard or lumpy. By this digestion the mineral is disintegrated and the bulk of the alumina existing as hydrate therein goes into solution. The contents of the digester are then filtered and the liquor drawn through. Then the mineral is taken from the filter and mixed with carbonate of soda in the proportion of about two and one-half to three parts to each two parts of alumina present. This mixture is then heated to a red heat for about five hours, and is then placed in tanks and lixiviated with the liquor made in the digester. In this instance the liquor is of a red turbid appearance, which arises from the action of the caustic liquor upon the ferric oxide in the mineral, which liberates the oxide in such an extremely fine state of division that in suspension it is carried through a filter or filter-press still turbid and red, and the red particles remain in suspension even after the liquor has stood several days. After this lixiviation of the furnaced mixture of mineral and soda we clarify the liquor by treating it with precipitated hydrated alumina, which, being voluminous, flocculent, and more or less gelatinous, collects and picks up or incloses these suspended particles and carries them down by precipitation. We effect this precipitation of the hydrated alumina within the liquid itself by using any known precipitant of alumina, such as carbonic acid or milk of lime, with agitation. We continue to add the precipitant until the liquid begins to become cloudy from the separation of the alumina, when the addition of precipitant is stopped. We then filter this liquid. In this manner we purify the liquor from iron oxide. We now add bicarbonate of soda in sufficient quantity to precipitate all of the remaining alumina, the liquor being heated and agitated. We then filter out the liquor and wash the alumina with water. The reaction with the bicarbonate may be represented as follows: $Na_2Al_2O_4 + 2NaHCO_3 + 2H_2O = 2NaCO_3 + 2Al_2(HO)_6$. This gives us alumina precipitated from the alkaline solution, retaining from one to ten per cent. of its weight in alkali, and this soda can only be washed out by long and protracted washing. Accordingly, after washing with a reasonable amount water, we heat this alumina in a solution of ammonium chloride, which changes the soda into common salt without acting upon the alumina. This salt can then be easily washed out, and the resulting pure alumina is taken from the filter and calcined to render it anhydrous. This treatment with ammonium chloride is also applicable to alumina precipitated by carbonic-acid gas.

We have above described our process as applied to red bauxite in which the iron is fully oxidized and to bauxite containing unoxidized matter and foreign matter; but it is evident that there are many other kinds of bauxite when their component materials are considered, and which will require in their treatment to separate and obtain the alumina variations in and departures from the process above described, some of such variations consisting in preliminary treatment and some in intermediate steps introduced into the above process, and we do not therefore limit ourselves to the process and the precise steps above given.

It will be seen that after the iron, &c., in the bauxite is oxidized we extract the greater part of the alumina in the wet state and before the mineral is dried, and that the alumina obtained in this way is exceedingly pure, and that by the remaining steps we extract the remainder existing, as $Al_2O_3$. It will be seen, also, that some bauxite will be so perfectly oxidized naturally that we can by the first step obtain all of the alumina, or so much thereof that further treatment of the residue would be unprofitable.

What we claim as our invention, and desire to secure by Letters Patent, is—

1. In the art of obtaining alumina from ferrous bauxite, the process of oxidizing the iron and organic matter therein, consisting in mixing the ground mineral with a solution of a hypochlorite, and then passing carbonic-acid gas into the solution.

2. The process of obtaining alumina from bauxite, consisting in oxidizing the iron and organic matter therein by treatment, substantially as described, with a hypochlorite and carbonic-acid gas, and then treating the oxidized bauxite with a caustic-soda solution, filtering out the liquor, precipitating the hydrate of aluminum, and calcining it, substantially as set forth.

In witness whereof we have hereunto set our hands this 16th day of April, 1891.

JOSEPH ALBERT BRADBURN.
JOHN DOWNER PENNOCK.

In presence of—
HOWARD P. DENISON,
C. B. KINNE.